July 10, 1951 E. L. C. WHITE 2,560,378

FREQUENCY MODULATION DETECTOR

Filed April 30, 1946

INVENTOR.
Eric L.C. White
BY C.D. Tuska
ATTORNEY

Patented July 10, 1951

2,560,378

UNITED STATES PATENT OFFICE 2,560,378

FREQUENCY MODULATION DETECTOR

Eric Lawrence Casling White, Iver, England, assignor to Electric and Musical Industries Limited, Hayes, England, a company of Great Britain Application April 30, 1946, Serial No. 666,033
In Great Britain June 29, 1945

5 Claims. (Cl. 250—27)

Figure 1:
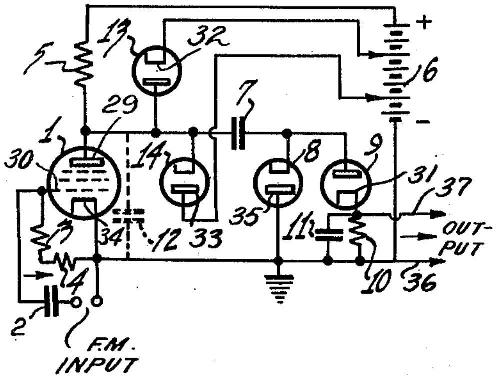

This invention relates to electrical counter circuits in which a pair of unilaterally-conducting devices are employed associated with a condenser as described in the specification of British Patent No. 471,731. Such a counter circuit can be employed for a variety of purposes and as described in the RCA Review, volume 6, January 1942, page 269, such a circuit is employed for the purpose of detecting frequency-modulated oscillations. Detection is effected by counting the applied oscillations and developing an output signal proportional to the frequency of the oscillations. In the specific detector circuit described, the modulated oscillations are fed to the grid of a valve which is arranged to function as a limiter on both the positive and negative peaks of the applied oscillations so that the anode current of the limiter valve swings from zero to a fixed maximum value on each oscillation and equal voltage pulses are fed to said condenser and the charge per cycle developed in said condenser is independent of the frequency of the oscillations.

Such a counter type detector circuit is satisfactory when the frequency range of the applied oscillations is small but when oscillations covering a wide frequency range, such as frequency-modulated television signals which may have a signal frequency range from 6 megacycles per second to 9 megacycles per second, are applied to said valve, it is found that the anode load of said valve varies with frequency to such an extent that the voltage developed across it is no longer equal for all oscillation frequencies and the charge per cycle developed in said condenser is no longer independent of frequency. Whilst it is possible to reduce the variation by reducing the value of the condenser and the anode load impedance of said valve, such expedients lead to a reduction in the sensitivity of the circuit and hence render it inefficient.

The object of the present invention is to provide an improved counter circuit which is especially suitable for use in the detection of frequency-modulated oscillations with a view to overcoming or reducing the above-mentioned difficulties.

According to the present invention there is provided an electrical counter circuit comprising means for setting up across the counter circuit signal voltages the amplitude of which varies with the frequency of the oscillations to be counted and means for limiting the amplitude of said signal voltages prior to feeding them to said counting circuit so that the charge per cycle applied to said counting circuit is substantially constant for a wide frequency range.

In using the invention as applied to a detector for frequency-modulated oscillations extending over a wide frequency range, the oscillations to be detected may be fed to an amplifier valve which is allowed to develop signals, the amplitude of which varies with the frequency of the applied oscillations and prior to feeding the developed signals to the counter circuit they are limited in amplitude so that the amplitude at all frequencies is no greater than the amplitude at the highest frequency developed by said valve. With such an arrangement it is therefore unnecessary to reduce the anode load impedance of the valve or said condenser as mentioned above so that the circuit can be designed to provide a desired sensitivity whilst at the same time the circuit can be caused to operate substantially linearly over a wide frequency range.

The said valve may to some extent function as a limiter and it may even be advantageous in some cases to employ said valve in conjunction with another valve, said two valves being connected together by a common cathode impedance so as to improve the limiting action performed thereby.

When employing the invention for the detection of frequency-modulated oscillations the sensitivity of the circuit may be further improved by introducing an inductance into the anode circuit of said valve or said pair of valves, said inductance being tuned with the associated capacities to resonate at the mean frequency of the modulated oscillations. If desired, the two unilaterally-conducting devices employed in the counter circuit may be so arranged as to provide a push-pull output.

Figure 2:
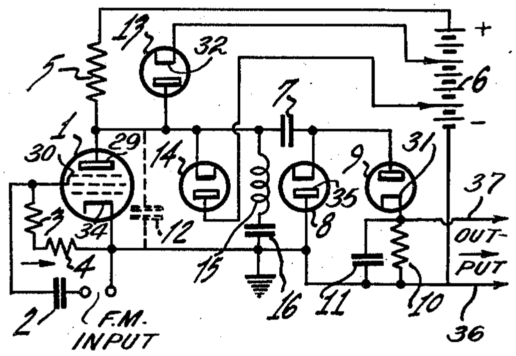
Figures 3, 4:
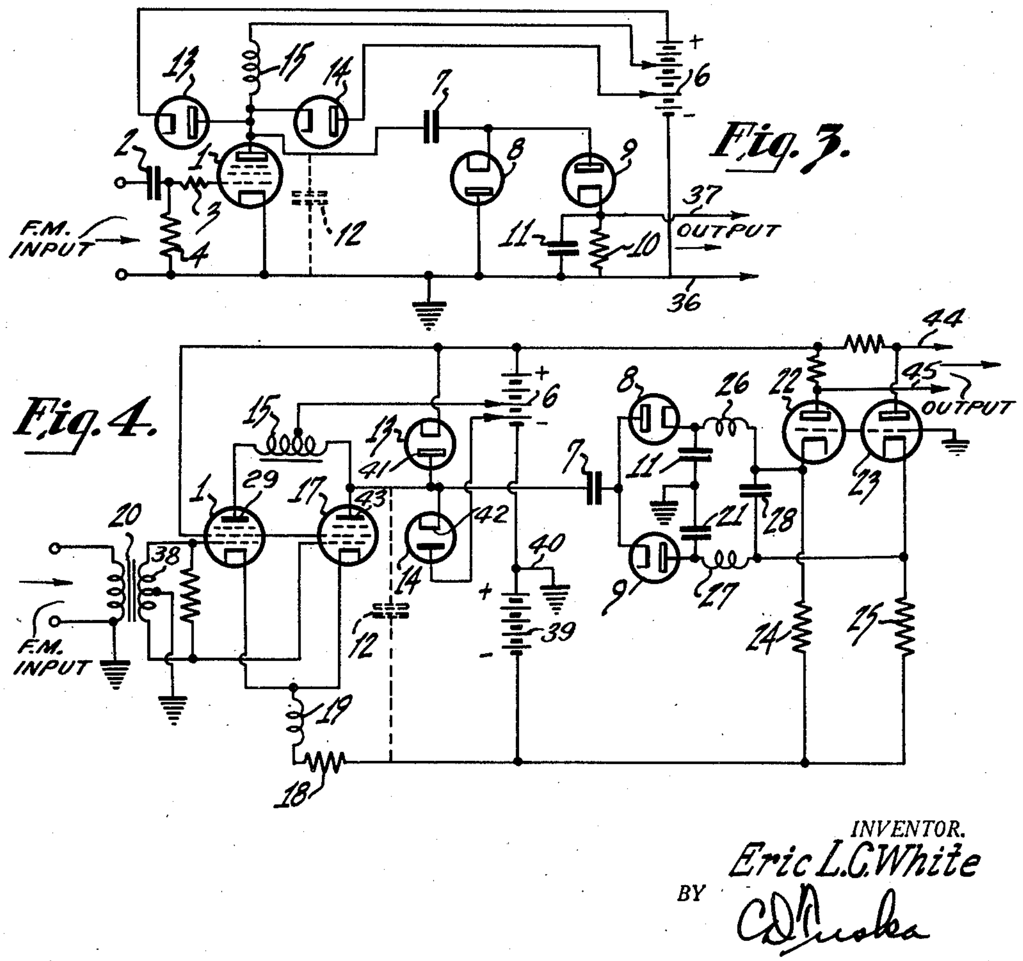

In order that the said invention may be clearly understood and readily carried into effect, it will now be more fully described with reference to the accompanying drawings in which:

Figure 1 is a circuit embodying the invention and suitable for use as a detector of frequency-modulated oscillations, and Figures 2, 3 and 4 are similar circuits embodying modifications.

Referring first to Figure 1 of the drawings, the reference numeral 1 indicates an amplifier valve to the control grid 30 of which frequency-modulated oscillations are applied via a coupling condenser 2, series resistance 3 and leak resistance 4, the anode 29 of the valve 1 being connected through a load resistance 5 to a source of anode potential 6. The anode of the valve 1 is connected via a condenser 7 to a counter circuit comprising two oppositely-connected unilaterally-conducting devices shown in the form of diodes 8 and 9, the cathode 31 of the diode 9 including an output resistance 10 which is shunted by a high-frequency bypass condenser 11. If signals are applied to the valve 1 covering a narrow frequency range between, for example, 100 and 300 kc., the valve 1 can be arranged to limit the amplitude of the developed signals on both the positive and negative peaks thereof so that the charge applied to the condenser 7 is substantially constant throughout the frequency range. Where, however, it is desired to apply a wide frequency range of signals to said valve, such as in the case of television signals above mentioned, then it is found that owing to the presence of the condenser 7 and of the stray capacity associated with the anode of the valve 1, which is indicated by the condenser 12, the charge applied to the condenser 7 is no longer constant with variation in frequency. As stated above it is possible to overcome this difficulty by reducing the value of the resistance 5 and the capacity 7, but such expedients give rise to a reduction in the sensitivity of the circuit. In the example of the invention shown in Figure 1, in order to overcome this difficulty the values of the capacity 7 and anode resistance 5 are chosen having regard to providing the appropriate sensitivity for the circuit and the amplitude of the signals developed by the valve 1 is limited to a constant value by the provision of limiting means comprising a pair of unilaterally-conducting devices shown as diodes 13 and 14 which are oppositely connected in the manner indicated so as to provide a limiting action on both the positive and negative peaks of the signals developed by the valve 1. The cathode 32 of the diode 13 and the anode 33 of the diode 14 are connected to suitable tapping points on the source 6 respectively above and below the mean anode potential of valve 1 and these tapping points are so chosen that the amplitude of the signals developed by the valve 1 are limited to a value not exceeding the amplitude of the signal developed at the highest frequency. In this manner the charge per cycle applied to the condenser 7 can be arranged to be substantially constant over a wide frequency range whilst at the same time good sensitivity can be achieved. The valve 1 may of course be arranged to effect some degree of limiting.

The circuit shown in Figure 2 of the drawings is similar to the circuit shown in Figure 1 but is modified by the introduction of an inductance 15 connected across the anode 29 and cathode 34 of the valve 1 through a D. C. blocking condenser 16. Thus, the cathode 34 of the valve 1, the anode 35 of the rectifier 8 and the low voltage terminals of the resistor 10 and the capacitor 11 are all connected to ground which forms one output terminal 36 of the device. The other output terminal 37 is connected to the cathode 31 of the rectifier 9. This inductance is chosen in conjunction with the condenser 7 and the stray capacity 12 to resonate at the mean frequency of the applied signals which further increases the sensitivity of the circuit.

The increase in sensitivity afforded by the circuits of Figures 1 and 2 and the subsequent Figures 3 and 4 may of course be utilized to provide an increased output across the resistance 10 or may be utilized to improve the linearity of the circuit by permitting a reduction in the value of the resistance 10.

If desired, instead of connecting the inductance 15 in the manner shown in Figure 2 of the drawings, the inductance 15 may be connected between the anode of the valve 1 and the source of potential 6 as indicated in Figure 3, the inductance being connected to a tapping point on the source 6 midway between the potentials applied to the cathode of diode 13 and the anode of diode 14.

As shown in Figure 4, the valve 1 may be associated with another valve 17 to form a push-pull pair with a high common cathode impedance which may comprise a resistance 18 or choke 19 or a resistance and choke 18 and 19 in series. The modulated oscillations are applied in push-pull to the control electrodes of valves 1 and 17 from the secondary winding 38 of an input transformer 20. The winding 38 is grounded at its midpoint. Potential for operating the valves 1 and 17 is derived from the source 6 and a source 39, a ground connection 40 being provided between the two sources. In this modification, the anode 41 of the limiting rectifier 13 and the cathode 42 of the limiting rectifier 14 are connected to the anode 43 of the valve 17 instead of to the anode 29 of the valve 1 as in the case of Figures 1, 2 and 3. Potential is applied from the positive terminal of the source 6 to the screen grids of the valves 1 and 17. The use of the push-pull pair shown in Figure 4 improves the limiting action of the circuit compared with the arrangements shown in Figures 1, 2 and 3. As shown in Figure 4, the inductance 15 is connected between the anodes of the valves 1 and 17 and is centre-tapped to a suitable point on the anode potential source 6 so that the anode current of both valves 1 and 17 may be utilized.

If desired, in the circuits shown in Figures 1, 2, 3 and 4, the diode 8 may also be provided with an output resistance shunted by a bypass condenser whereby a push-pull output may be obtained from the diodes 8 and 9. The advantage of such an arrangement is that the ratio of ripple voltage to signal is halved and the ripple frequency doubled thus permitting easier filtering of the ripple frequency to be obtained. Furthermore, the linearity of the circuits shown may be improved by providing, in effect, a low value for the output resistance or resistances of the diodes 8 and 9, by the use of shunt voltage feedback from an amplifier stage to which the output from the resistance or resistances of the diodes 8 and 9 is fed or by feeding the output current or currents from said resistance or resistances directly into the cathode or cathode circuits of a following amplifier. In Figure 4 of the drawings the latter arrangement is shown as applied to the case in which the diodes 8 and 9 are arranged to provide a push-pull output. In this case the anode of the diode 9 is connected to a condenser 21 corresponding to the condenser 11, the cathode of the diode 8 being connected to the cathode of an amplifier valve 22 whilst the anode of the diode 9 is connected to the cathode of a further amplifier valve 23 the valves 22 and 23 being provided with cathode resistances 24 and 25 respectively. The cathode of the diode 8 and the anode of diode 9 are connected to the valves 22 and 23 via inductances 26 and 27 which together with a condenser 28 form a filter for filtering the ripple frequency. The control electrodes of the valves 22 and 23 are earthed as shown and the anodes of the two valves provide the required push-pull output at the terminals 44 and 45.

The invention is particularly applicable for the purpose of detecting frequency-modulated oscillations, but may also be employed in general where it is desired to provide a counting circuit for use over a wide frequency range. The invention may also be used in frequency-modulated altimeters.

I claim as my invention:

1. The combination of an electron discharge device having a cathode and an anode and a grid for controlling the current between said cathode and anode, means for applying a frequency modulated signal to said grid, a pair of diodes oppositely connected to said anode, means for applying a potential to the cathode of one of said diodes and to the anode of the other of said diodes which is respectively above and below the mean potential of the anode of said electron discharge device so that the amplitude of the output signal of said electron discharge device is limited to an amplitude not exceeding the amplitude of the cycle of said signal having the highest frequency, and means connected between said cathode and anode for resonating the output circuit of said electron discharge device at the mean frequency of said signal.

2. The combination of an electron discharge device having a cathode and an anode and a grid for controlling the current between said cathode and anode, means for applying a frequency modulated signal to said grid, a pair of diodes oppositely connected to said anode, means for applying a potential to the cathode of one of said diodes and to the anode of the other of said diodes which is respectively above and below the mean potential of the anode of said electron discharge device to predetermined negative potentials so that the amplitude of the output signal of said electron discharge device is limited to an amplitude not exceeding the amplitude of the cycle of said siggnal having the highest frequency, and an inductance connected in the anode lead of said electron discharge device, the value of said inductace being selected to resonate with the output circuit of said electron discharge device at the mean frequency of said signal.

3. The combination of a pair of electron discharge devices connected in push-pull and each having a cathode and an anode and a grid for controlling the current between said cathode and anode, means for applying a frequency modulated signal between the grids of said devices, a pair of diodes oppositely connected to the anode of one of said devices, means for applying a potential to the cathode of one of said diodes and to the anode of the other of said diodes which is respectively above and below the mean potential of the anode of the one of said devices to which said pair of diodes is connected, high impedance means common to the cathode leads of said devices and a counter type detector circuit coupled to the common connection of said pair of diodes.

4. The combination of a pair of electron discharge devices connected in push-pull and each having a cathode and an anode and a grid for controlling the current between said cathode and anode, means for applying a frequency modulated signal between the grids of said devices, a pair of diodes oppositely connected to the anode of one of said devices, means for applying a potential to the cathode of one of said diodes and to the anode of the other of said diodes which is respectively above and below the mean potential of the anode of the one of said devices to which said pair of diodes is connected, high impedance means common to the cathode leads of said devices, a filter network, a second pair of diodes oppositely connected to said filter network, and amplifying means coupled through said filter network and said second pair of diodes to the anode of said one device.

5. The combination of a pair of electron discharge devices connected in push-pull and each having a cathode and an anode and a grid for controlling the current between said cathode and anode, means for applying a frequency modulated signal between the grids of said devices, a pair of diodes oppositely connected to the anode of one of said devices, means for applying a potential to the cathode of one of said diodes and to the anode of the other of said diodes which is respectively above and below the mean potential of the anode of the one of said devices to which said pair of diodes is connected, and high impedance means common to the cathode leads of said devices, a filter network, a second pair of diodes oppositely connected to said filter network, amplifying means coupled through said filter network and said second pair of diodes to the anode of said one device, and means for deriving from said amplifying means a potential which is proportional to the number of cycles of said signals.

ERIC LAWRENCE CASLING WHITE.

REFERENCES CITED

The following references are of record in the file of this patent:

UNITED STATES PATENTS

| Number | Name | Date |
|---|---|---|
| 2,113,011 | White | Apr. 5, 1938 |
| 2,190,319 | Koch | Feb. 13, 1940 |
| 2,286,378 | Roberts | June 16, 1942 |
| 2,298,657 | Smith et al. | Oct. 13, 1942 |
| 2,312,070 | Bliss | Feb. 23, 1943 |
| 2,340,429 | Rankin | Feb. 1, 1944 |
| 2,341,937 | Maynard | Feb. 15, 1944 |
| 2,357,932 | Crosby | Sept. 12, 1944 |
| 2,404,026 | Beard et al. | July 16, 1946 |